United States Patent
Zeng et al.

(10) Patent No.: US 11,589,379 B2
(45) Date of Patent: Feb. 21, 2023

(54) RESOURCE ALLOCATION METHOD, DEVICE, AND SYSTEM

(71) Applicant: Huawei Technologies Co., Ltd., Shenzhen (CN)

(72) Inventors: Longji Zeng, Shenzhen (CN); Lang He, Dongguan (CN); Aiying Wang, Shenzhen (CN); Jiangli Luo, Dongguan (CN); Zhouyu Deng, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 26 days.

(21) Appl. No.: 17/093,309

(22) Filed: Nov. 9, 2020

(65) Prior Publication Data

US 2021/0058959 A1    Feb. 25, 2021

Related U.S. Application Data (63) Continuation of application No. PCT/CN2018/086173, filed on May 9, 2018.

(51) Int. Cl.
*H04W 72/12* (2009.01)
*H04W 72/04* (2023.01)
(Continued)

(52) U.S. Cl.
CPC ... *H04W 72/1289* (2013.01); *H04W 72/0486* (2013.01); *H04W 72/121* (2013.01); *H04W 72/1226* (2013.01); *H04W 72/1273* (2013.01)

(58) Field of Classification Search
None
See application file for complete search history.

(56) References Cited

U.S. PATENT DOCUMENTS

2017/0251462 A1*  8/2017  Chae ............... H04W 52/40
2017/0318593 A1  11/2017  Eriksson et al.

FOREIGN PATENT DOCUMENTS

| CN | 105991243 A | 10/2016 |
| CN | 107079463 A | 8/2017 |
| EP | 3179824 A1 | 6/2017 |

OTHER PUBLICATIONS

"Discussion on UL multiplexing of URLLC and eMBB," 3GPP TSG RAN WG1 Ad Hoc Meeting, Vancouver, Canada, R1-1800057, Total 8 pages, 3rd Generation Partnership Project, Valbonne, France (Jan. 22-26, 2018).

(Continued)

*Primary Examiner* — Kouroush Mohebbi
(74) *Attorney, Agent, or Firm* — Leydig, Voit & Mayer, Ltd.

(57) ABSTRACT

A method, a device, and a system for resource allocation are provided to improve network capacities. The method implemented by an access network device includes: obtaining a first quantity of repetitions M and a first MCS order that are of a scheduling resource of a first terminal, and a second quantity of repetitions N and a second MCS order that are of a scheduling resource of a second terminal; calculating overlapping areas of first and second total scheduling resources based on the first and second quantities of repetitions and the first and second MCS orders, respectively; determining a maximum overlapping area of the first total scheduling resource based on the calculated overlapping areas; and allocating to the second terminal, N consecutive scheduling resources overlapping with the first total scheduling resource, wherein an overlapping area is less than or equal to the maximum overlapping area.

16 Claims, 7 Drawing Sheets

(51) Int. Cl.
*H04W 72/121* (2023.01)
*H04W 72/1273* (2023.01)

(56) References Cited

OTHER PUBLICATIONS

"3rd Generation Partnership Project; Technical Specification Group Radio Access Network; Evolved Universal Terrestrial Radio Access (E-UTRA); Physical channels and modulation (Release 15)," 3GPP TS 36.211 V15.1.0, pp. 1-221, 3rd Generation Partnership Project, Valbonne, France (Mar. 2018).

"3rd Generation Partnership Project; Technical Specification Group Radio Access Network; Evolved Universal Terrestrial Radio Access (E-UTRA); Multiplexing and channel coding (Release 15)," 3GPP TS 36.212 V15.1.0, pp. 1-234, 3rd Generation Partnership Project, Valbonne, France (Mar. 2018).

"3rd Generation Partnership Project; Technical Specification Group Radio Access Network; Evolved Universal Terrestrial Radio Access (E-UTRA); Physical layer procedures (Release 15)," 3GPP TS 36.213 V15.1.0, Total 499 pages, 3rd Generation Partnership Project, Valbonne, France (Mar. 2018).

* cited by examiner

RESOURCE ALLOCATION METHOD, DEVICE, AND SYSTEM

CROSS-REFERENCE TO RELATED APPLICATIONS

This application is a continuation of International Application No. PCT/CN2018/086173, filed on May 9, 2018, the disclosure of which is hereby incorporated by reference in its entirety.

TECHNICAL FIELD

Embodiments of this application relate to the field of communications technologies, and in particular, to a resource allocation method, a device, and a system.

BACKGROUND

As the internet of things (IoT) develops rapidly, major operators around the world use the internet of things as a key development strategy one after another. To help an operator quickly seize an IoT market and reuse long term evolution (LTE), a cellular cell internet of things (CIoT) technology is proposed. The CIoT technology mainly features deep coverage, an ultra-large quantity of user connections, and the like. To implement the feature of deep coverage of the CIoT technology, a repetition technology is proposed. The repetition technology may mean that same data is scheduled in a same resource block in consecutive subframes (that is, consecutive scheduling resources), and a receive end obtains a higher combining gain through hybrid automatic retransmission (HARQ) combination, to achieve the deep coverage.

Figure 1:
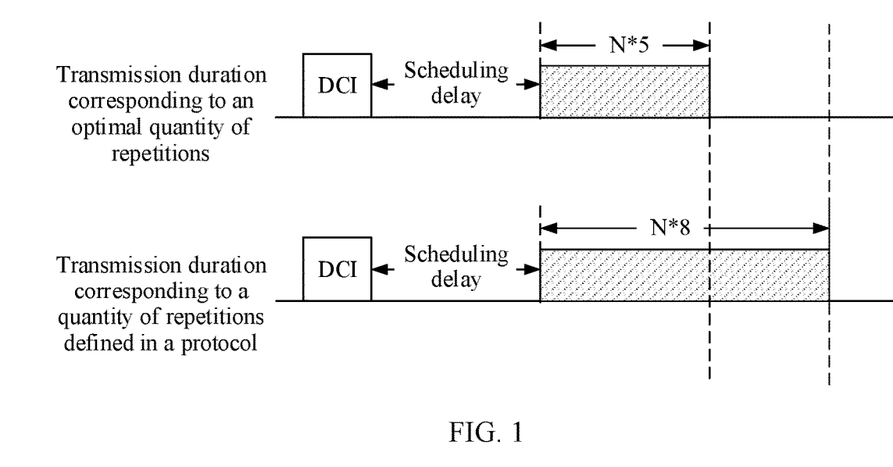
FIG. 1 is a schematic diagram of existing resource allocation.

Currently, a quantity of repetitions of a scheduling resource used for scheduling UE in a CIoT system is determined based on a quantity of repetitions defined in a protocol. Generally, to ensure transmission reliability, the quantity of repetitions used for scheduling the UE in the CIoT system is greater than or equal to a quantity of repetitions required by the UE that is obtained through evaluation based on an actual measurement result. For example, as shown in FIG. 1, a repetition quantity set of an uplink resource defined in the protocol is {1, 2, 4, 8, 16, 32, 64, 128}, but an optimal repetition quantity that meets frequency efficiency and that is obtained through evaluation based on a signal to interference plus noise ratio (SINR) of UE is 5. However, an option of 5 is not included in the repetition quantity set defined in the protocol. Therefore, it is determined, according to the protocol definition, that the repetition quantity used for actually scheduling the UE needs to be greater than the optimal repetition quantity 5, to be specific, the repetition quantity 8 is selected. In this way, scheduling resources are wasted, and network capacities are reduced.

SUMMARY

Embodiments of this application provide a resource allocation method, a device, and a system, to resolve a problem that existing network capacities are reduced.

To achieve the foregoing objective, the following technical solutions are used in the embodiments of this application.

According to a first aspect of the embodiments of this application, a resource allocation method is provided, including: obtaining, by an access network device, a quantity of repetitions M and a modulation and demodulation scheme (MCS) order that are of a scheduling resource of a first terminal, and a quantity of repetitions N and an MCS order that are of a scheduling resource of a second terminal; calculating, based on the quantity of repetitions and the MCS order that are of the scheduling resource of the first terminal, an overlapping area of M consecutive scheduling resources allocated by the access network device to the first terminal, and calculating, based on the quantity of repetitions and the MCS order that are of the scheduling resource of the second terminal, an overlapping area of N consecutive scheduling resources to be allocated to the second terminal; determining a maximum overlapping area of a first total scheduling resource based on the overlapping area of the first total scheduling resource and the overlapping area of a second total scheduling resource; and allocating, to the second terminal, the N consecutive scheduling resources overlapping with the first total scheduling resource, where an overlapping area of the N consecutive scheduling resources is less than or equal to the maximum overlapping area. Based on the solution provided in this embodiment of this application, when allocating the scheduling resource to the second terminal, the access network device first determines, based on the quantity of repetitions M and the MCS order that are of the scheduling resource of the first terminal, the overlapping area of the first total scheduling resource allocated to the first terminal, and determines, based on the quantity of repetitions N and the MCS order that are of the scheduling resource of the second terminal, the overlapping area of the second total scheduling resource allocated to the second terminal; then determines, based on the two overlapping areas, a maximum overlapping area in which the second terminal can be allowed to overlap and that is on a total scheduling resource of the first terminal; and allocates the maximum overlapping area to the second terminal, so that the first terminal and the second terminal share the scheduling resources. In this way, the first terminal and the second terminal can share scheduling data of a same scheduling resource without affecting communication reliability of the first terminal and the second terminal, thereby reducing scheduling resource consumption and improving network capacities.

In a first possible design, with reference to the first aspect, the calculating, by the access network device, an overlapping area of a first total scheduling resource based on the quantity of repetitions M and the MCS order that are of the scheduling resource of the first terminal includes: calculating, by the access network device, a first demodulation capability-related value of the first terminal based on M and the MCS; calculating a second demodulation capability-related value of the first terminal based on an actual communication environment; and determining the overlapping area of the first total scheduling resource based on a difference between the first demodulation capability-related value and the second demodulation capability-related value, where the demodulation capability-related value in the possible design may be an SINR value. Similarly, for a manner in which the access network device calculates the overlapping area of the first total scheduling resource based on the quantity of repetitions N and the MCS order that are of the scheduling resource of the second terminal, refer to this manner. In other words, a scheduling resource corresponding to a demodulation capability-related value other than scheduling resources required by a demodulation capability-related value in a current actual communication environment is used as an overlapping scheduling resource. In this way, communication reliability of the first terminal or the second terminal can be ensured.

In a second possible design, with reference to the first aspect or the second aspect, the determining, by the access network device, a maximum overlapping area of the first total scheduling resource based on the overlapping area of the first total scheduling resource and the overlapping area of the second total scheduling resource includes: determining, by the access network device, a minimum overlapping area in the overlapping area of the first total scheduling resource and the overlapping area of the second total scheduling resource, and using the minimum overlapping area as the maximum overlapping area of the first total scheduling resource. To be specific, the minimum overlapping area in the overlapping area is used as an area in which the first terminal and the second terminal overlap, and the first terminal and the second terminal can share only scheduling resources in the minimum overlapping area, which avoids communication reliability of the second terminal being affected when the first terminal shares the scheduling resource, and similarly, avoids communication reliability of the first terminal being affected when the second terminal shares the scheduling resource.

In a third possible design, when the scheduling resource is an uplink scheduling resource, because the first terminal and the second terminal share the scheduling resource to send uplink data, the access network device demodulates data of the first terminal and data of the second terminal by using an interference cancellation technology. Specifically, the method includes: receiving, by the access network device, data on the first total scheduling resource; and if the data of the first terminal is successfully demodulated, demodulating, in the maximum overlapping area, the data of the second terminal by using the data of the first terminal and the interference cancellation technology. On the contrary, if the data of the second terminal is first successfully demodulated, the data of the first terminal is demodulated in the maximum overlapping area by using the data of the second terminal and the interference cancellation technology. In this way, the uplink data can be demodulated by using the interference cancellation technology, thereby improving demodulation performance in the overlapping area.

In a fourth possible design, when the scheduling resource is a downlink scheduling resource, if the maximum overlapping area of the first terminal is not occupied by an air interface, the access network device schedules, in the maximum overlapping area, data of the second terminal. In other words, the second terminal may preempt the maximum overlapping area, and downlink data is scheduled by using scheduling resources in the area. In this way, when the downlink data is sent, data of different terminals may be separately sent. For the first terminal or the second terminal, downlink data of the first terminal or the second terminal may be directly demodulated on a scheduling resource on which the downlink data of the first terminal or the second terminal is sent.

According to a second aspect, an embodiment of this application provides an access network device. The access network device may implement functions performed by the access network device in the foregoing aspects or the possible designs. The functions may be implemented by hardware, or may be implemented by hardware executing corresponding software. The hardware or the software includes one or more modules corresponding to the functions. For example, the access network device may include an obtaining unit, a calculation unit, a determining unit, and an allocation unit.

The obtaining unit is configured to obtain a quantity of repetitions M and an MCS order that are of a scheduling resource of a first terminal, and a quantity of repetitions N and an MCS order that are of a scheduling resource of a second terminal; the calculation unit is configured to: calculate an overlapping area of a first total scheduling resource based on the quantity of repetitions and the MCS order that are of the scheduling resource of the first terminal and that are obtained by the obtaining unit, and calculate an overlapping area of a second total scheduling resource based on the quantity of repetitions and the MCS order that are of the scheduling resource of the second terminal and that are obtained by the obtaining unit; the determining unit is configured to determine a maximum overlapping area of the first total scheduling resource based on the overlapping area of the first total scheduling resource and the overlapping area of the second total scheduling resource that are obtained by the calculation unit through calculation; and the allocation unit is configured to allocate, to the second terminal, N consecutive scheduling resources overlapping with the first total scheduling resource.

For a specific implementation of the access network device, refer to behavior and functions of the access network device in the resource allocation method according to any one of the first aspect or the possible designs of the first aspect. Details are not described herein again. Therefore, the provided access network device can achieve a same beneficial effect as that in any one of the first aspect or the possible designs of the first aspect.

According to a third aspect, an access network device is provided, including a processor and a memory. The memory is configured to store a computer-executable instruction. When the access network device runs, the processor executes the computer-executable instruction stored in the memory, so that the access network device performs the resource allocation method according to any one of the first aspect or the possible designs of the first aspect.

According to a fourth aspect, a computer-readable storage medium is provided. The computer-readable storage medium stores an instruction, and when the instruction is run on a computer, the computer is enabled to perform the resource allocation method according to any one of the first aspect or the possible designs of the first aspect.

According to a fifth aspect, a computer program product including an instruction is provided. When the computer program product runs on a computer, the computer is enabled to perform the resource allocation method according to any one of the first aspect or the possible designs of the first aspect.

According to a sixth aspect, a chip system is provided. The chip system includes a processor and a communications interface, and is configured to support an access network device in implementing the functions in the foregoing aspects, for example, support the processor in obtaining a quantity of repetitions M and an MCS order that are of a scheduling resource of a first terminal, and a quantity of repetitions N and an MCS order that are of a scheduling resource of the second terminal; in calculating an overlapping area of a first total scheduling resource based on the obtained quantity of repetitions and the MCS order that are of the scheduling resource of the first terminal, and calculating an overlapping area of a second total scheduling resource based on the obtained quantity of repetitions and the MCS order that are of the scheduling resource of the second terminal; in determining a maximum overlapping area of the first total scheduling resource based on the overlapping area that is of the first total scheduling resource and that is obtained through calculation and the overlapping area that is of the second total scheduling resource and that is obtained through calculation; and in allocating, to the second terminal, N consecutive scheduling resources overlapping with the first total scheduling resource. In a possible design, the chip system further includes a memory, and the memory is configured to store a program instruction and data that are necessary for the access network device. The chip system may include a chip, or may include a chip and another discrete component.

For technical effects brought by any one of the designs in the second aspect to the sixth aspect, refer to technical effects brought by any one of the first aspect or the possible designs of the first aspect. Details are not described again.

According to a seventh aspect, an embodiment of this application further provides a resource allocation system, including the access network device and the terminal according to any one of the second aspect to the sixth aspect.

These aspects or other aspects in this application may be clearer and more intelligible in descriptions in the following embodiments.

DESCRIPTION OF EMBODIMENTS

The following describes implementations in the embodiments of this application in detail with reference to the accompanying drawings.

Figure 2:
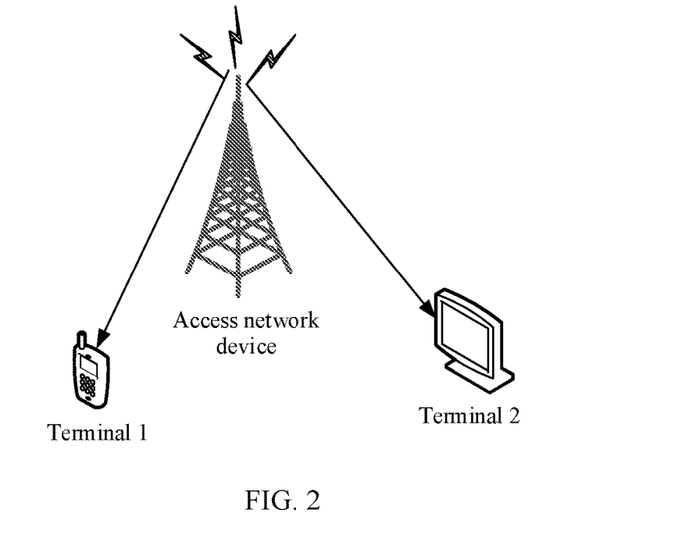
FIG. 2 is a simplified schematic diagram of a system architecture according to an embodiment of this application.

The resource allocation method provided in the embodiments of this application may be applied to a communications system shown in FIG. 2. The communications system may be a CIoT system, or may be a next radio (NR) system (for example, a 5th Generation (5G) communications system), or may be a long term evolution (LTE) system or another mobile communications system that transmits data by using a repetition technology. As shown in FIG. 2, the communications system may include an access network device and a plurality of terminals. The access network device may be wirelessly connected to the plurality of terminals. The access network device is deployed by an operator, and is mainly configured to implement functions such as a radio physical control function, resource allocation and radio resource management, radio access control, and mobility management. The access network device may be an access network (AN)/radio access network (RAN) device, or a network device including a plurality of 5G-AN/5G-RAN nodes, or an access node such as a base station (NodeB, NB), a transmission point (TRP), or an evolved NodeB (Evolution NodeB, eNB). The terminal may be configured to connect to the access network device through a wireless air interface, and then access a data network. The terminal may be user equipment (UE), for example, a mobile phone or a computer, or may be a smart household, a wearable device, a cellular phone, a cordless phone, a session initiation protocol (SIP) phone, an intelligent telephone, a wireless local loop (WLL) station, a personal digital assistant (PDA), a computer, a laptop computer, a handheld communications device, a handheld computing device, a satellite wireless device, a wireless modem card, a TV set-top box (STB), a customer premises equipment (CPE), and/or another device configured to perform communication in a wireless system. It should be noted that FIG. 2 is merely an example of a framework diagram. A quantity of nodes included in FIG. 2 is not limited, and in addition to function nodes shown in FIG. 2, another node such as a core network device, a gateway device, or an application server may be further included. This is not limited.

In the communications system shown in FIG. 2, the access network device may allocate one or more scheduling resources to the terminal, and the access network device and the terminal transmit data to each other by using a repetition technology. The scheduling resource may be a time domain resource or a frequency domain resource. Based on a data transmission direction, the scheduling resource may be classified into a downlink scheduling resource and an uplink scheduling resource. The uplink scheduling resource may be a scheduling resource used to transmit uplink data, and the downlink scheduling resource may be a scheduling resource used to transmit downlink data, where the uplink data may be data sent from the terminal to the access network device, and the downlink data may be data sent from the access network device to the terminal. The access network device may allocate one or more scheduling resources to the terminal by using the resource allocation solution provided in the embodiments of this application. For example, in a possible design, when allocating one or more scheduling resources to a terminal, the access network device allocates the scheduling resources overlapping with scheduling resources of other terminals to the terminal without affecting transmission reliability of the another terminal. In this way, different terminals can schedule data in an overlapping area, thereby reducing scheduling resource consumption and increasing network capacities. For example, all or some of additional 30% of scheduling resources in FIG. 1 may be allocated to another terminal for use, to avoid a waste of resources. Specifically, for the possible design, refer to a solution shown in FIG. 4.

Figure 3:
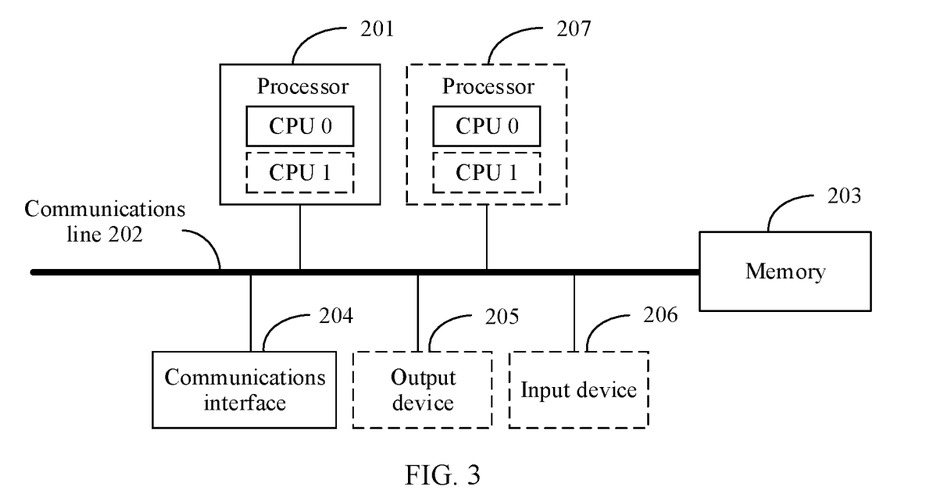
FIG. 3 is a schematic composition diagram of an access network device according to an embodiment of this application.

To implement the technical solutions provided in the embodiments of this application, the access network device in FIG. 2 may include components shown in FIG. 3. As shown in FIG. 3, the access network device 200 includes at least one processor 201, a communications line 202, a memory 203, and at least one communications interface 204.

The processor 201 may include, but is not limited to, a central processing unit (CPU), an application-specific integrated circuit (ASIC), and one or more integrated circuits configured to implement the embodiments of this application, for example, one or more microprocessors (Digital Signal Processor, DSP), or one or more field programmable gate arrays (FPGA). The communications line 202 may include a path for transmitting information between the foregoing components.

The communications interface 204 is configured to communicate, by using any apparatus such as a transceiver, with another device or a communications network such as Ethernet, a radio access network (RAN), or a wireless local area network (WLAN).

The memory 203 may include, but is not limited to, a read-only memory (ROM), a static storage device, a random access memory (RAM), a dynamic storage device, an electrically erasable programmable read-only memory (EEPROM), a compact disc read-only memory (CD-ROM), optical disc storage (including a compressed optical disc, a laser disc, an optical disc, a digital versatile disc, a Blu-ray disc, and the like), and a disk storage medium. The memory may exist independently, and is connected to the processor through the communications line 202. The memory may alternatively be integrated with the processor.

The memory 203 is configured to store a computer-executable instruction for executing the solutions of this application, and the processor 201 controls the execution. The processor 201 is configured to execute the computer-executable instruction stored in the memory 203, to implement the resource allocation method according to the following embodiments of this application. Optionally, the computer-executable instruction in the embodiments of this application may also be referred to as application program code. This is not specifically limited in the embodiments of this application.

During specific implementation, in an embodiment, the processor 201 may include one or more CPUs, for example, a CPU 0 and a CPU 1 in FIG. 3. During specific implementation, in an embodiment, the access network device 200 may include a plurality of processors, for example, the processor 201 and a processor 207 in FIG. 3. The processors each may be a single-core processor, or may be a multi-CPU processor. The processor herein may be one or more devices, circuits, and/or processing cores configured to process data (for example, a computer program instruction).

During specific implementation, in an embodiment, the access network device 200 may further include an output device 205 and an input device 206. The output device 205 communicates with the processor 201, and may display information in a plurality of manners. For example, the output device 205 may be a liquid crystal display (LCD), a light emitting diode (LED) display device, a cathode ray tube (CRT) display device, a projector, or the like. The input device 206 communicates with the processor 201, and may receive an input of a user in a plurality of manners. For example, the input device 206 may be a mouse, a keyboard, a touchscreen device, a sensing device, or the like.

It should be noted that the access network device 200 may be a general-purpose device or a dedicated device. During specific implementation, the access network device 200 may be a desktop computer, a portable computer, a network server, a PDA, a mobile phone, a tablet computer, a wireless terminal, an embedded device, or a device having a structure similar to that in FIG. 3. A type of the access network device 200 is not limited in the embodiments of this application.

Figure 4:
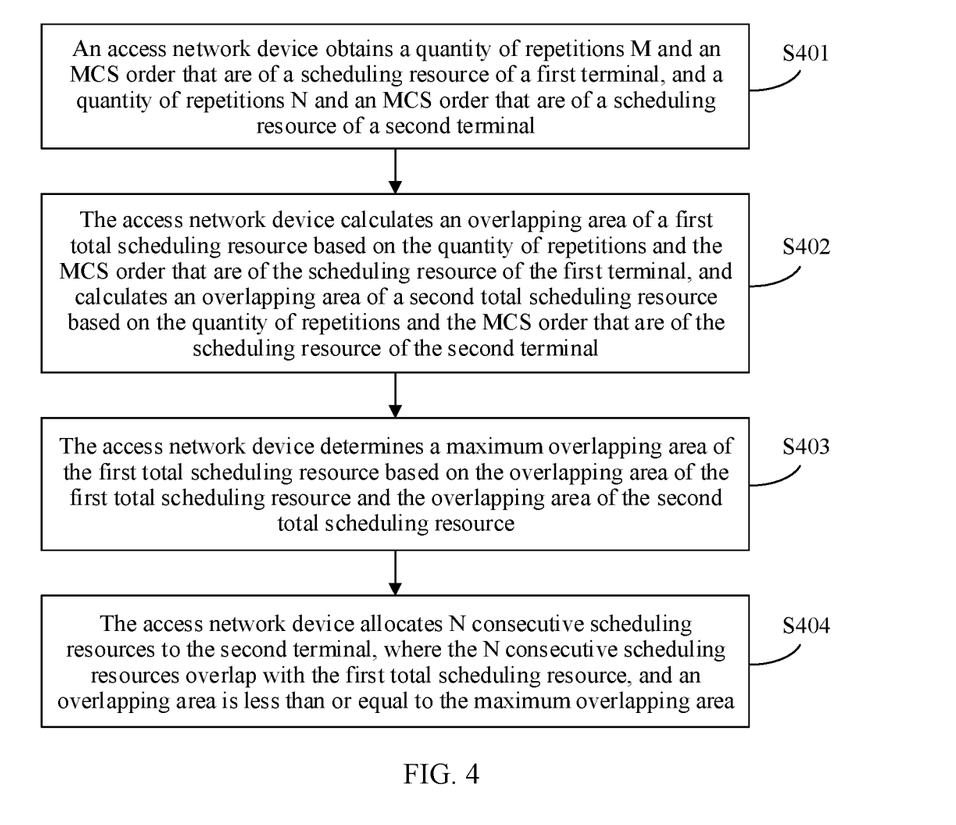
FIG. 4 is a flowchart of a resource allocation method according to an embodiment of this application.

With reference to the system shown in FIG. 2, the following describes a resource allocation method according to an embodiment of this application. FIG. 4 is a flowchart of a resource allocation method according to an embodiment of this application. The resource allocation method is performed by the access network device in FIG. 2. As shown in FIG. 4, the method may include S401 to S404.

S401: The access network device obtains a quantity of repetitions M and an MCS order that are of a scheduling resource of a first terminal, and a quantity of repetitions N and an MCS order that are of a scheduling resource of a second terminal.

M is an integer greater than or equal to 1, N is an integer greater than or equal to 1, and M and N may be the same or different. This is not limited.

The first terminal and the second terminal may be different terminals in the system shown in FIG. 2. For example, the first terminal may be a scheduled terminal, where the access network device has allocated a scheduling resource to the first terminal; and the second terminal may be a to-be-scheduled terminal, where the access network device waits to allocate a scheduling resource to the second terminal.

The quantity of repetitions M and the MCS order that are of the scheduling resource of the first terminal meet demodulation capability requirements such as reliability and effectiveness of current communication between the access network device and the first terminal, and may be obtained by the access network device through calculation according to a scheduling algorithm. Similarly, the quantity of repetitions N and the MCS order that are of the scheduling resource of the second terminal meet demodulation capability requirements such as reliability and effectiveness of current communication between the access network device and the second terminal, and may also be obtained by the access network device through calculation according to a scheduling algorithm.

The scheduling algorithm may refer to: collecting, based on simulation data or network operation data, statistics about a minimum required SINR value based on a specific quantity of repetitions M and an MCS order when a specific block error rate (for example, a 10% block error rate) is met, and forming a mapping table of the SINR to the quantity of repetitions M and the MCS order. In subsequent resource scheduling, an SINR value obtained based on current measured data or an SINR value measured and reported by the terminal may be used as an input, and a combination of a quantity of repetitions M and an MCS order that correspond to the SINR value is selected, through a query on the table, to be used as the delivered quantity of repetitions M and the MCS order when resources are scheduled by the UE.

S402: The access network device calculates an overlapping area of a first total scheduling resource based on the quantity of repetitions and the MCS order that are of the scheduling resource of the first terminal, and calculates an overlapping area of a second total scheduling resource based on the quantity of repetitions and the MCS order that are of the scheduling resource of the second terminal.

The first total scheduling resource may be M consecutive scheduling resources allocated by the access network device to the first terminal, and the second total scheduling resource may be N consecutive scheduling resources to be allocated to the second terminal.

The overlapping area of the first total scheduling resource may be a scheduling resource that is in the first total scheduling resource and that can be shared with another terminal without affecting transmission reliability of the first terminal. Similarly, the overlapping area of the second total scheduling resource may be a scheduling resource that is in the second total scheduling resource and that can be shared with another terminal without affecting transmission reliability of the second terminal. The overlapping area may be indicated by a ratio of a shared scheduling resource in the total scheduling resource to the total scheduling resource, or may be indicated by a specific resource size. For example, it is assumed that the total scheduling resource includes scheduling resources that are on a carrier 1 and that are in a slot 0 to a slot 14, therefore, the overlapping area of the total scheduling resource may be indicated by a 27% of the total scheduling resource, or may be indicated by scheduling resources that are on the carrier 1 and that are in a slot 11 to the slot 14.

Specifically, the access network device may calculate a first demodulation capability-related value of the first terminal based on the quantity of repetitions M and the MCS that are of the scheduling resource of the first terminal; calculate a second demodulation capability-related value of the first terminal based on an actual communication environment; and determine the overlapping area of the first total scheduling resource based on a difference between the first demodulation capability-related value and the second demodulation capability-related value.

Similarly, the access network device may further calculate a third demodulation capability-related value of the second terminal based on the quantity of repetitions N and the MCS that are of the scheduling resource of the second terminal; calculate a fourth demodulation capability-related value of the second terminal based on an actual communication environment; and determine the overlapping area of the fourth total scheduling resource based on a difference between the third demodulation capability-related value and the fourth demodulation capability-related value.

The demodulation capability-related value in the embodiments of this application may include, but is not limited to, an SINR value. To meet a communication reliability requirement, the first demodulation capability-related value may be greater than the second demodulation capability-related value, and the third demodulation capability-related value may be greater than the fourth demodulation capability-related value.

The calculating a first demodulation capability-related value of the first terminal based on the quantity of repetitions M and the MCS that are of the scheduling resource of the first terminal may be: collecting, through simulation data or network operation data, statistics about an average SINR value obtained based on the quantity of repetitions M and the MCS order that are of the scheduling resource when a specific block error rate (for example, a 10% block error rate) is met, and using the SINR value as the first demodulation capability-related value of the first terminal. Similarly, for calculation of the third demodulation capability-related value of the second terminal based on the quantity of repetitions N and the MCS that are of the scheduling resource of the second terminal, refer to this process. Details are not described again.

The calculating a second demodulation capability-related value of the first terminal based on an actual communication environment may be: using an actual measured value (for example, an SINR value) of a radio signal or a value (for example, an SINR value) measured and reported by the first terminal as the second demodulation capability-related value. Similarly, for calculation of the fourth demodulation capability-related value of the second terminal based on an actual communication environment, refer to this process. Details are not described again.

The determining the overlapping area of the first total scheduling resource based on a difference between the first demodulation capability-related value and the second demodulation capability-related value may be: collecting, based on simulation data or network operation data, statistics about SINR differences based on different overlapping proportions in a specific quantity of repetitions M and an MCS order when a specific block error rate (for example, a 10% block error rate) is met, to form a query table. In subsequent scheduling, an overlapping proportion allowed by a corresponding SINR difference can be queried in the table.

For example, it is assumed that a demodulation capability-related value is an SINR value, a demodulation capability-related indicator SINR_Covered is obtained through calculation based on an MCS order and a quantity of repetitions that are for scheduling UE A, and a demodulation capability that is actually required by the UE A and that is obtained through calculation based on an actual communication environment in which the UE A is located is SINR_Required, where SINR_Coverted>=SINR_Required. If the SINR_Required is closer to the SINR_Covered, a quantity of repetitions of the scheduling resources actually used by the UE A is closer to an optimal quantity of repetitions of the UE A obtained through calculation based on the actual communication environment, so that fewer scheduling resources are wasted, and spectral scheduling efficiency is higher.

S403: The access network device determines a maximum overlapping area of the first total scheduling resource based on the overlapping area of the first total scheduling resource and the overlapping area of the second total scheduling resource.

The maximum overlapping area may be a maximum area in which the first total scheduling resource and the second total scheduling resource may overlap.

Specifically, the access network device may determine a minimum overlapping area in the overlapping area of the first total scheduling resource and the overlapping area of the second total scheduling resource, and use the minimum overlapping area as the maximum overlapping area of the first total scheduling resource.

For example, assuming that an area of a 30% of a total scheduling resource 1 is an overlapping area, and an area of a 20% of a total scheduling resource 2 is an overlapping area, it is determined that a minimum overlapping area is 20%, that is, a maximum overlapping area of the total scheduling resource 1 is 20%.

S404: The access network device allocates the N consecutive scheduling resources to the second terminal, where the N consecutive scheduling resources overlap with the first total scheduling resource, and an overlapping area is less than or equal to the maximum overlapping area.

In this embodiment of this application, that the access network device allocates a scheduling resource to the terminal may mean that the access network device indicates the scheduling resource of the terminal by using downlink control information (DCI). For example, that the access network device allocates the N consecutive scheduling resources to the second terminal may mean that the access network device delivers DCI to the second terminal, where the DCI carries indication information used to indicate the N consecutive scheduling resources allocated by the access network device to the second terminal.

An uplink scheduling resource is carried on a physical uplink shared channel (PUSCH) and sent to the access network device. A downlink scheduling resource is carried on a physical downlink shared channel (PUDCH) and sent to the terminal.

Figure 4A:
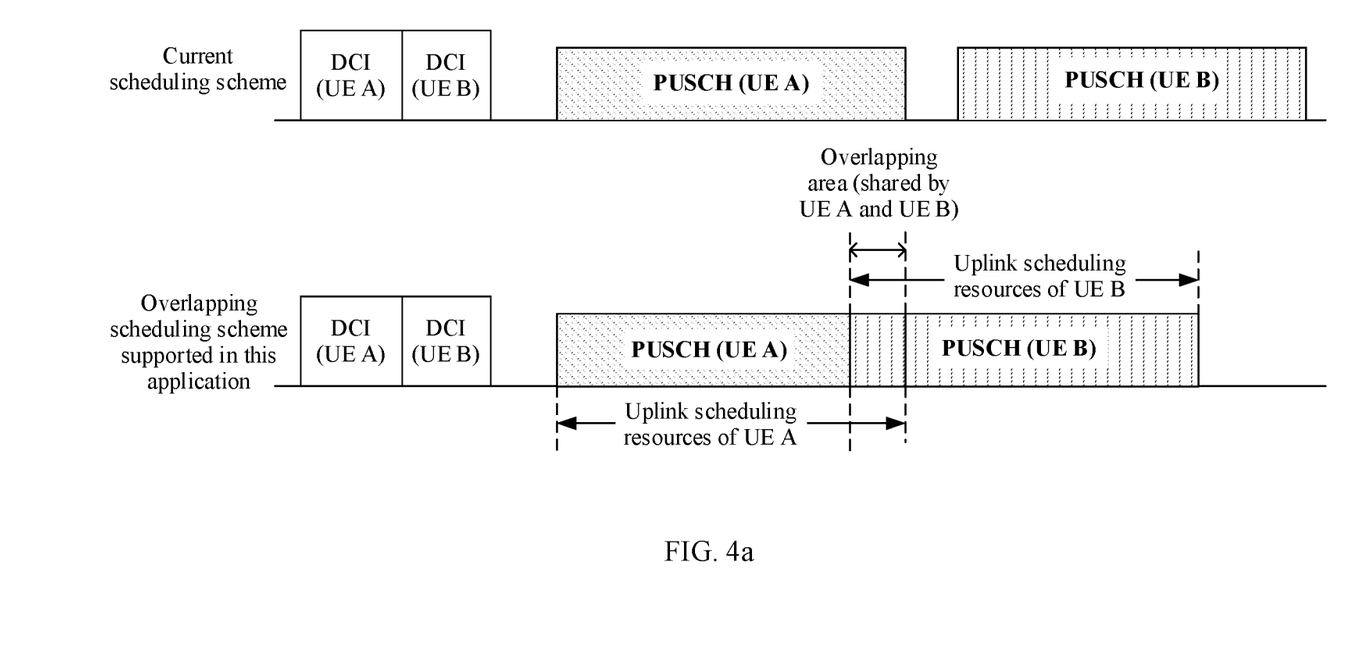
FIG. 4a is a schematic diagram of uplink resource allocation according to an embodiment of this application.

For example, FIG. 4a is a schematic diagram of overlapping uplink scheduling resources. As shown in FIG. 4a, in a current scheduling scheme, UE A and UE B separately occupy different uplink scheduling resources (PUSCH) that are independent of each other. In an overlapping scheduling scheme supported in this application, the UE B can share the uplink scheduling resources with the UE A in an overlapping area allowed by the UE A.

Figure 4B:
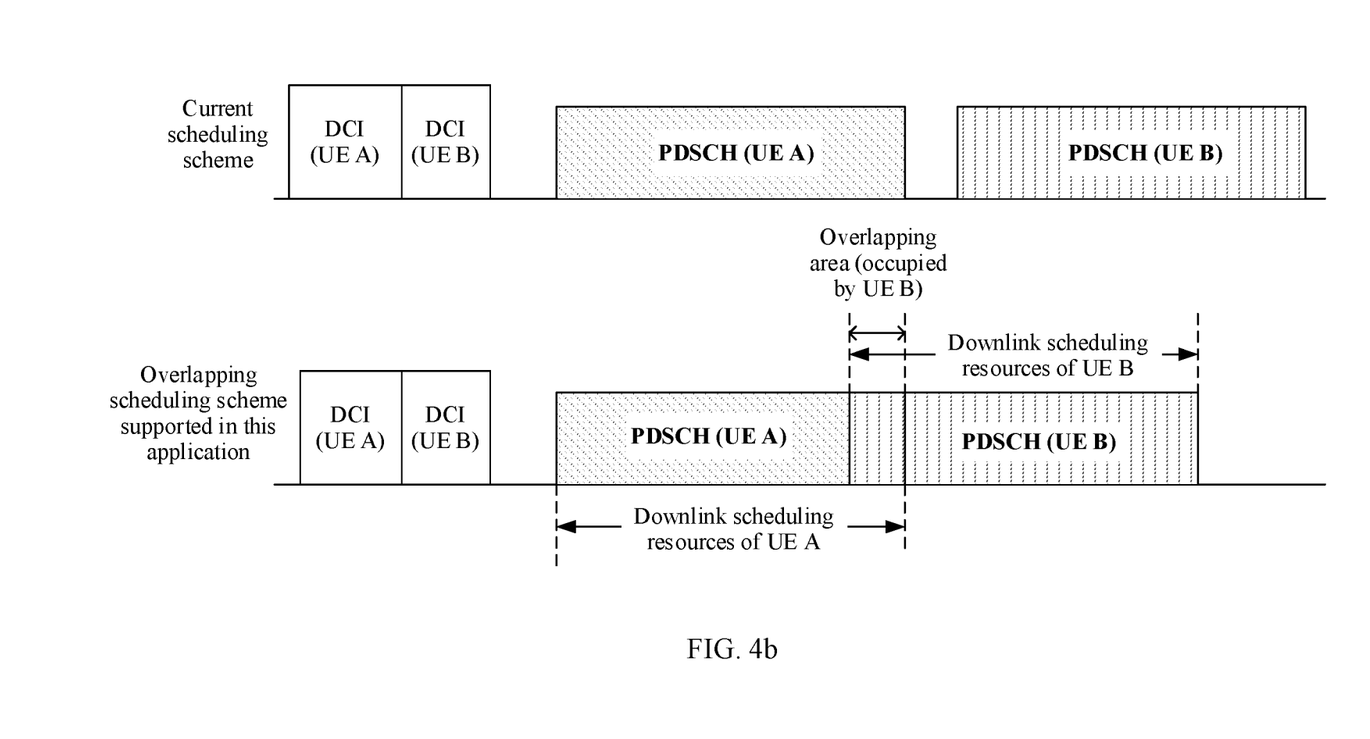
FIG. 4b is a schematic diagram of downlink resource allocation according to an embodiment of this application.

FIG. 4b is a schematic diagram of overlapping downlink scheduling resources. As shown in FIG. 4b, in a current scheduling scheme, UE A and UE B separately occupy different downlink scheduling resources (PDSCH) that are independent of each other. In an overlapping scheduling scheme supported in this application, the UE B can preempt some downlink scheduling resources of the UE A in an overlapping area allowed by the UE A.

Compared with that in the prior art, in the scheme shown in FIG. 4, when allocating the scheduling resource to the second terminal, the access network device first obtains the quantity of repetitions M and the MCS order that are of the scheduling resource of the first terminal, and the quantity of repetitions N and the MCS order that are of the scheduling resource of the second terminal; calculates the overlapping area of the first total scheduling resource based on the quantity of repetitions and the MCS order that are of the scheduling resource of the first terminal, and calculates the overlapping area of the second total scheduling resource based on the quantity of repetitions and the MCS order that are of the scheduling resource of the second terminal; further determines the maximum overlapping area of the first total scheduling resource based on the overlapping area of the first total scheduling resource and the overlapping area of the second total scheduling resource; and allocates, to the second terminal, the N consecutive scheduling resources overlapping with the first total scheduling resource, where the overlapping area is less than or equal to the maximum overlapping area. In this way, the scheduling resources overlapping with the scheduling resources of the first terminal are allocated to the second terminal, so that different terminals can schedule data in the overlapping area, thereby reducing scheduling resource consumption and increasing network capacities.

Further, when the scheduling resource is an uplink scheduling resource, the scheme shown in FIG. 4 may further include:

receiving, by the access network device, data on the first total scheduling resource; if the access network device successfully demodulates data of the first terminal, demodulating, by the access network device in the maximum overlapping area, data of the second terminal by using the data of the first terminal and an interference cancellation technology; and on the contrary, if the access network device successfully demodulates, in the maximum overlapping area, the data of the first terminal, demodulating, by the access network device, the data of the first terminal by using the data of the second terminal and the interference cancellation technology.

For a process in which the access network device successfully demodulates the data of the first terminal or the data of the second terminal, refer to that in the prior art. Details are not described again.

Figure 4C:
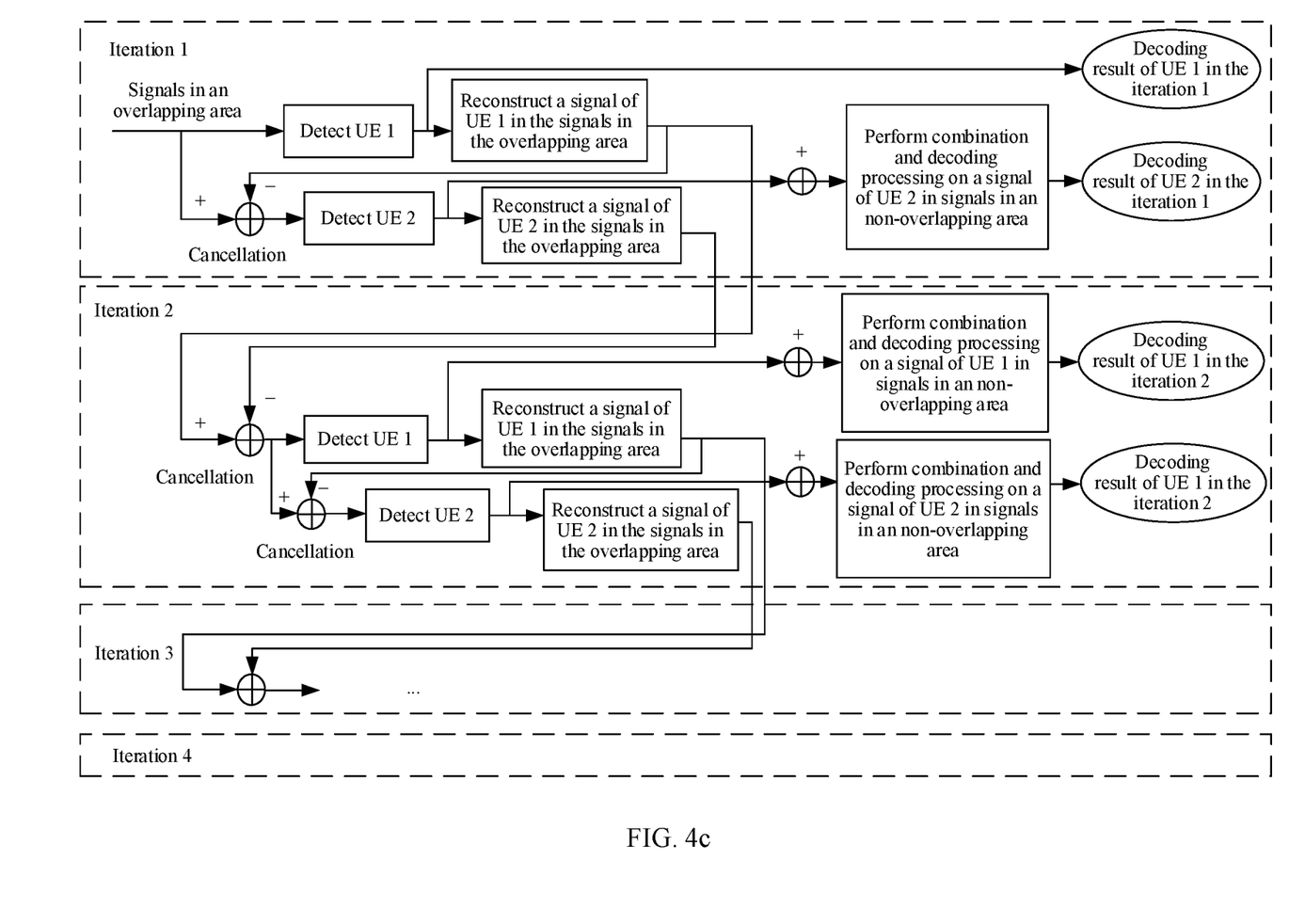
FIG. 4c is a schematic flowchart of interference cancellation according to an embodiment of this application.

A process in which the access network device demodulates, in the maximum overlapping area, data of the second terminal by using the data of the first terminal and an interference cancellation technology shown in FIG. 4c may include: storing key data of a signal of the first terminal (including but not limited to baseband data of an original signal, a decoding result, a channel estimation result, and the like), then performing reconstruction processing on a signal in an overlapping part, and using the signal as a to-be-canceled signal. Signal baseband data in the overlapping part is extracted from baseband data of the second terminal, cancellation processing is performed on the signal baseband data in the overlapping part and a reconstructed signal of the first terminal, and a signal obtained through the interference cancellation is demodulated and decoded. If the decoding succeeds, a decoding result is output, or if the decoding fails, iterative processing of the foregoing process may be performed for a plurality of times, to obtain a higher interference cancellation gain.

Further, when the scheduling resource is a downlink scheduling resource, the solution shown in FIG. 4 may further include: if the maximum overlapping area is not occupied by an air interface, scheduling, by the access network device in the maximum overlapping area, data of the second terminal.

The foregoing mainly describes the solutions provided in the embodiments of this application from a perspective of interaction between the network elements. It may be understood that, to implement the foregoing functions, each network element, for example, the access network device, includes a corresponding hardware structure and/or software module for performing the functions. A person skilled in the art should easily be aware that, in combination with the examples described in the embodiments disclosed in this specification, algorithm steps may be implemented by hardware or a combination of hardware and computer software. Whether a function is performed by hardware or computer software driving hardware depends on particular applications and design constraint conditions of the technical solutions. A person skilled in the art may use different methods to implement the described functions for each particular application, but it should not be considered that the implementation goes beyond the scope of this application.

In the embodiments of this application, the access network device may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that, in the embodiments of this application, the module division is an example, and is merely a logical function division. In actual implementation, another division manner may be used.

Figure 5:
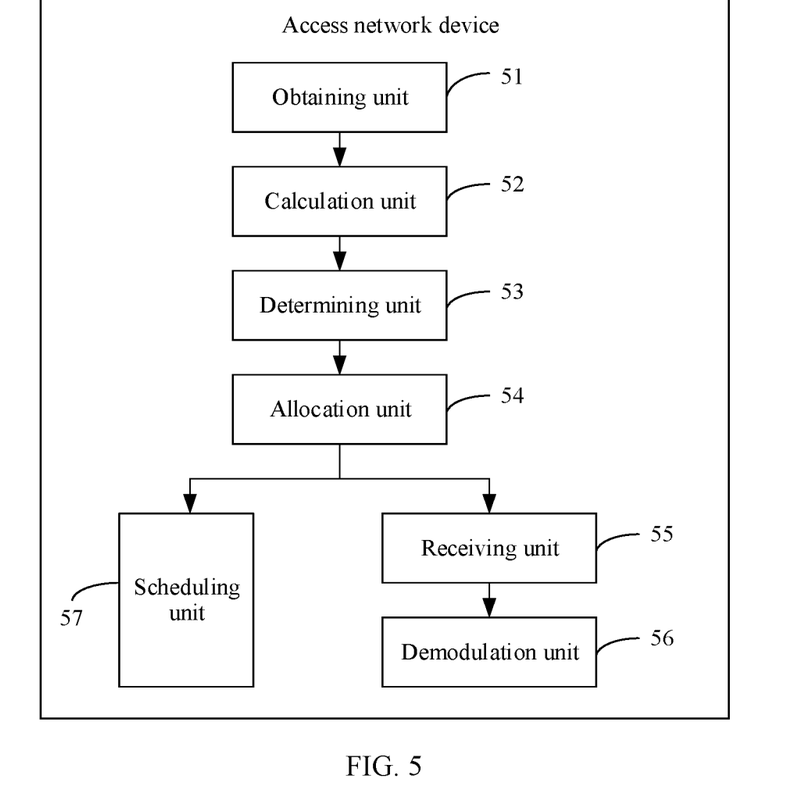
FIG. 5 is a schematic composition diagram of another access network device according to an embodiment of this application.

When each functional module is obtained through division based on each corresponding function, FIG. 5 is still another possible schematic composition diagram of the access network device in the foregoing embodiments. As shown in FIG. 5, the access network device may include an obtaining unit 51, a calculation unit 52, a determining unit 53, and an allocation unit 54.

The obtaining unit 51 is configured to obtain a quantity of repetitions M and a modulation and coding scheme MCS order that are of a scheduling resource of a first terminal, and a quantity of repetitions N and an MCS order that are of a scheduling resource of a second terminal, where M is an integer greater than or equal to 1, and N is an integer greater than or equal to 1.

The calculation unit 52 is configured to: calculate an overlapping area of a first total scheduling resource based on the quantity of repetitions and the MCS order that are of the scheduling resource of the first terminal and that are obtained by the obtaining unit 51, and calculate an overlapping area of a second total scheduling resource based on the quantity of repetitions and the MCS order that are of the scheduling resource of the second terminal and that are obtained by the obtaining unit 51, where the first total scheduling resource is M consecutive scheduling resources allocated by the access network device to the first terminal, and the second total scheduling resource is N consecutive scheduling resources to be allocated to the second terminal.

The determining unit 53 is configured to determine a maximum overlapping area of the first total scheduling resource based on the overlapping area of the first total scheduling resource and the overlapping area of the second total scheduling resource that are obtained by the calculation unit 52 through calculation.

The allocation unit 54 is configured to allocate the N consecutive scheduling resources to the second terminal, where the N consecutive scheduling resources overlap with the first total scheduling resource, and an overlapping area is less than or equal to the maximum overlapping area.

In this embodiment of this application, further, as shown in FIG. 5, when the scheduling resource is an uplink scheduling resource, the access network device may further include a receiving unit 55 and a demodulation unit 56.

The receiving unit 55 is configured to receive data on the first total scheduling resource.

The demodulation unit 56 is configured to: if data of the first terminal is successfully demodulated, demodulate, in the maximum overlapping area, data of the second terminal by using the data of the first terminal and an interference cancellation technology; and if the data of the first terminal is successfully demodulated in the maximum overlapping area, demodulate the data of the first terminal by using the data of the second terminal and the interference cancellation technology.

In this embodiment of this application, further, as shown in FIG. 5, when the scheduling resource is a downlink scheduling resource, the access network device may further include a scheduling unit 57.

The scheduling unit 57 is configured to: if the maximum overlapping area is not occupied by an air interface, schedule, in the maximum overlapping area, data of the second terminal.

It should be noted that all related content of the steps in the foregoing method embodiments may be cited in function descriptions of corresponding functional modules. Details are not described herein again.

The access network device provided in this embodiment of this application is configured to perform the foregoing data processing method, and therefore can achieve a same effect as that of the foregoing data processing method.

Figure 6:
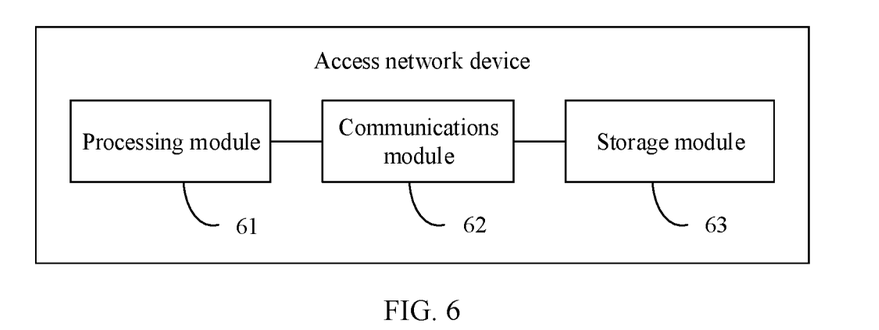
FIG. 6 is a schematic composition diagram of still another access network device according to an embodiment of this application.

When an integrated unit is used, FIG. 6 is another possible schematic composition diagram of the access network device in the foregoing embodiments. As shown in FIG. 6, the access network device includes a processing module 61 and a communications module 62.

The processing module 61 is configured to control and manage an action of the access network device. For example, the processing module 61 is configured to support the access network device in performing S401 to S404 in FIG. 4, and/or another process used for the technology described in this specification. The communications module 62 is configured to support communication between the access network device and another network entity, for example, communication between the access network device and a functional module or a network entity shown in FIG. 2. The access network device may further include a storage module 63, configured to store program code and data of the access network device.

The processing module 61 may be a processor or a controller. The processing module 61 may implement or execute various example logical blocks, modules, and circuits described with reference to content disclosed in this application. The processor may alternatively be a combination of processors implementing a computing function, for example, a combination of one or more microprocessors, or a combination of a DSP and a microprocessor. The communications module 62 may be a transceiver, a transceiver circuit, a communications interface, or the like. The storage module 63 may be a memory.

When the processing module 61 is a processor, the communications module 62 is a communications interface, and the storage module 63 is a memory, the access network device in this embodiment of this application may be the access network device shown in FIG. 3.

Based on the descriptions of the foregoing implementations, a person skilled in the art may clearly understand that, for the purpose of convenient and brief description, division of the foregoing functional modules is only used as an example for description. In actual application, the foregoing functions may be allocated to different functional modules for implementation based on a requirement, that is, an internal structure of an apparatus is divided into different functional modules, to implement all or some of the functions described above.

In the several embodiments provided in this application, it should be understood that the disclosed apparatus and method may be implemented in other manners. For example, the described apparatus embodiment is merely an example. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or the units may be implemented in electrical, mechanical, or other forms.

The units described as separate parts may or may not be physically separate, and parts displayed as units may be one or more physical units, may be located in one place, or may be distributed in a plurality of different places. Some or all of the units may be selected based on an actual requirement to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of the software functional unit and sold or used as an independent product, the integrated unit may be stored in a readable storage medium. Based on such an understanding, the technical solutions in the embodiments of this application essentially, or the part contributing to the prior art, or all or some of the technical solutions may be implemented in the form of a software product. The software product is stored in a storage medium and includes several instructions for instructing a device (which may be a single-chip microcomputer, a chip, or the like) or a processor to perform all or some of the steps of the methods described in the embodiments of this application. The foregoing storage medium includes: any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A resource allocation method comprising:
obtaining, by an access network device, a quantity of repetitions M and a modulation and coding scheme (MCS) order that are of a scheduling resource of a first terminal, and a quantity of repetitions N and an MCS order that are of a scheduling resource of a second terminal,
wherein M is an integer greater than or equal to 1, and N is an integer greater than or equal to 1,
wherein the quantity of repetitions M and the MCS order that are of the scheduling resource of the first terminal meet demodulation capability requirements of a current communication between the access network device and the first terminal and are obtained by the access network device through a calculation according to a scheduling algorithm, and
wherein the quantity of repetitions N and the MCS order that are of the scheduling resource of the second terminal meet demodulation capability requirements of a current communication between the access network device and the second terminal and are obtained by the access network device through a calculation according to the scheduling algorithm;
determining, by the access network device, an overlapping area of a first total scheduling resource based on the quantity of repetitions and the MCS order that are of the scheduling resource of the first terminal,
wherein the overlapping area of the first total scheduling resource is a scheduling resource that is in the first total scheduling resource and that can be shared with another terminal without affecting transmission reliability of the first terminal;
determining, by the access network device, an overlapping area of a second total scheduling resource based on the quantity of repetitions and the MCS order that are of the scheduling resource of the second terminal,
wherein the overlapping area of the second total scheduling resource is a scheduling resource that is in the second total scheduling resource and that can be shared with another terminal without affecting transmission reliability of the second terminal,
wherein the first total scheduling resource is M consecutive scheduling resources allocated by the access network device to the first terminal, and
wherein the second total scheduling resource is N consecutive scheduling resources to be allocated to the second terminal;
determining, by the access network device, a minimum overlapping area based on the overlapping area of the first total scheduling resource and the overlapping area of the second total scheduling resource, and using the minimum overlapping area as the maximum overlapping area of the first total scheduling resource; and
allocating, by the access network device, the N consecutive scheduling resources to the second terminal,
wherein the N consecutive scheduling resources overlap with the first total scheduling resource, and
wherein the overlapping area is less than or equal to the maximum overlapping area.

2. The method according to claim 1, wherein determining the overlapping area of the first total scheduling resource comprises:
determining, by the access network device, a first demodulation capability-related value of the first terminal based on M and the MCS;
determining, by the access network device, a second demodulation capability-related value of the first terminal based on an actual communication environment; and
determining, by the access network device, the overlapping area of the first total scheduling resource based on a difference between the first demodulation capability-related value and the second demodulation capability-related value.

3. The method according to claim 1, wherein the scheduling resource is an uplink scheduling resource; and the method further comprises:
receiving, by the access network device, data on the first total scheduling resource; and
in response to the access network device demodulating data of the first terminal, demodulating, by the access network device in the maximum overlapping area, data of the second terminal by using the data of the first terminal and an interference cancellation technology.

4. The method according to claim 3, further comprising:
in response to the access network device successfully demodulating, in the maximum overlapping area, the data of the first terminal, demodulating, by the access network device, the data of the first terminal by using the data of the second terminal and the interference cancellation technology.

5. The method according to claim 1, wherein the scheduling resource is a downlink scheduling resource; and the method further comprises:
in response to the maximum overlapping area not being occupied by an air interface, scheduling, by the access network device in the maximum overlapping area, data of the second terminal.

6. A communications device comprising at least one processor and a memory, wherein the memory is configured to store a computer program, so that when the computer program is executed by the at least one processor, the resource allocation method according to claim 1 is implemented.

7. An access network device comprising:
a processor; and
a memory couple to the processor and having processor-executable instructions stored thereon that, when executed by the processor, cause the access network device to:
obtain a quantity of repetitions M and a modulation and coding scheme (MCS) order that are of a scheduling resource of a first terminal, and a quantity of repetitions N and an MCS order that are of a scheduling resource of a second terminal,
wherein M is an integer greater than or equal to 1, and N is an integer greater than or equal to 1,
wherein the quantity of repetitions M and the MCS order that are of the scheduling resource of the first terminal meet demodulation capability requirements of a current communication between the access network device and the first terminal and are obtained by the access network device through a calculation according to a scheduling algorithm, and wherein the quantity of repetitions N and the MCS order that are of the scheduling resource of the second terminal meet demodulation capability requirements of a current communication between the access network device and the second terminal and are obtained by the access network device through a calculation according to the scheduling algorithm;

determine an overlapping area of a first total scheduling resource based on the quantity of repetitions and the MCS order that are of the scheduling resource of the first terminal, wherein the overlapping area of the first total scheduling resource is a scheduling resource that is in the first total scheduling resource and that can be shared with another terminal without affecting transmission reliability of the first terminal, determine an overlapping area of a second total scheduling resource based on the quantity of repetitions and the MCS order that are of the scheduling resource of the second terminal, wherein the overlapping area of the second total scheduling resource is a scheduling resource that is in the second total scheduling resource and that can be shared with another terminal without affecting transmission reliability of the second terminal, wherein the first total scheduling resource is M consecutive scheduling resources allocated by the access network device to the first terminal, and wherein the second total scheduling resource is N consecutive scheduling resources to be allocated to the second terminal;

determine a minimum overlapping area based on the overlapping area of the first total scheduling resource and the overlapping area of the second total scheduling resource, and using the minimum overlapping area as the maximum overlapping area of the first total scheduling resource; and allocate the N consecutive scheduling resources to the second terminal, wherein the N consecutive scheduling resources overlap with the first total scheduling resource, and wherein the overlapping area is less than or equal to the maximum overlapping area.

8. The access network device according to claim 7, wherein the instructions further cause the access network device to:

determine a first demodulation capability-related value of the first terminal based on M and the MCS of the first terminal;

determine a second demodulation capability-related value of the first terminal based on an actual communication environment; and determine the overlapping area of the first total scheduling resource based on a difference between the first demodulation capability-related value and the second demodulation capability-related value.

9. The access network device according to claim 7, wherein the scheduling resource is an uplink scheduling resource; and the instructions further cause the access network device to:

receive data on the first total scheduling resource; and in response to data of the first terminal being successfully demodulated, demodulate, in the maximum overlapping area, data of the second terminal by using the data of the first terminal and an interference cancellation technology.

10. The access network device according to claim 9, wherein the instructions further cause the access network device to:

in response to the access network device successfully demodulating, in the maximum overlapping area, the data of the first terminal, demodulate the data of the first terminal by using the data of the second terminal and the interference cancellation technology.

11. The access network device according to claim 7, wherein the scheduling resource is a downlink scheduling resource; and the instructions further cause the device to:

in response to the maximum overlapping area not being occupied by an air interface, schedule, in the maximum overlapping area, data of the second terminal.

12. A non-transitory computer storage medium, having a computer program stored thereon which when executed by a processor of an access network device, cause the device to implement operations including:

obtaining a quantity of repetitions M and a modulation and coding scheme (MCS) order that are of a scheduling resource of a first terminal, and a quantity of repetitions N and an MCS order that are of a scheduling resource of a second terminal, wherein M is an integer greater than or equal to 1, and N is an integer greater than or equal to 1, wherein the quantity of repetitions M and the MCS order that are of the scheduling resource of the first terminal meet demodulation capability requirements of a current communication between the access network device and the first terminal and are obtained by the access network device through a calculation according to a scheduling algorithm, and wherein the quantity of repetitions N and the MCS order that are of the scheduling resource of the second terminal meet demodulation capability requirements of a current communication between the access network device and the second terminal and are obtained by the access network device through a calculation according to the scheduling algorithm;

determining an overlapping area of a first total scheduling resource based on the quantity of repetitions and the MCS order that are of the scheduling resource of the first terminal, wherein the overlapping area of the first total scheduling resource is a scheduling resource that is in the first total scheduling resource and that can be shared with another terminal without affecting transmission reliability of the first terminal;

determining an overlapping area of a second total scheduling resource based on the quantity of repetitions and the MCS order that are of the scheduling resource of the second terminal, wherein the overlapping area of the second total scheduling resource is a scheduling resource that is in the second total scheduling resource and that can be shared with another terminal without affecting transmission reliability of the second terminal, wherein the first total scheduling resource is M consecutive scheduling resources allocated by the access network device to the first terminal, and wherein the second total scheduling resource is N consecutive scheduling resources to be allocated to the second terminal;

determining a minimum overlapping area based on the overlapping area of the first total scheduling resource and the overlapping area of the second total scheduling resource, and using the minimum overlapping area as the maximum overlapping area of the first total scheduling resource; and allocating the N consecutive scheduling resources to the second terminal, wherein the N consecutive scheduling resources overlap with the first total scheduling resource, and the overlapping area is less than or equal to the maximum overlapping area.

13. The non-transitory computer storage medium according to claim 12, wherein the operation of determining the overlapping area of the first total scheduling resource comprises:

determining a first demodulation capability-related value of the first terminal based on M and the MCS;

determining a second demodulation capability-related value of the first terminal based on an actual communication environment; and determining the overlapping area of the first total scheduling resource based on a difference between the first demodulation capability-related value and the second demodulation capability-related value.

14. The non-transitory computer storage medium according to claim 12, wherein the scheduling resource is an uplink scheduling resource and the operations further comprise:

receiving data on the first total scheduling resource; and in response to the access network device successfully demodulating data of the first terminal, demodulating, in the maximum overlapping area, data of the second terminal by using the data of the first terminal and an interference cancellation technology.

15. The non-transitory computer storage medium according to claim 14, wherein the operations further comprise:

in response to the access network device successfully demodulating, in the maximum overlapping area, the data of the first terminal, demodulating the data of the first terminal by using the data of the second terminal and the interference cancellation technology.

16. The non-transitory computer storage medium according to claim 12, wherein the scheduling resource is a downlink scheduling resource and the operations further comprise:

in response to the maximum overlapping area not being occupied by an air interface, scheduling, in the maximum overlapping area, data of the second terminal.

* * * * *